United States Patent Office 3,479,358
Patented Nov. 18, 1969

3,479,358
HEXAHYDRO-9,4a - IMINOETHANO-4a-H-XANTHENES AND PROCESS FOR THEIR PRODUCTION
Holgar V. Hansen, Morris Plains, Sylvester Klutchko, Hackettstown, and Robert I. Meltzer, Rockaway, N.J., assignors to Warner-Lambert Pharmaceutical Company, Morris Plains, N.J., a corporation of Delaware
No Drawing. Filed Sept. 19, 1966, Ser. No. 580,177
Int. Cl. C07d 7/42
U.S. Cl. 260—286    18 Claims

ABSTRACT OF THE DISCLOSURE

Hexahydro - 9,4a - iminoethano-4aH-xanthenes of the formula:

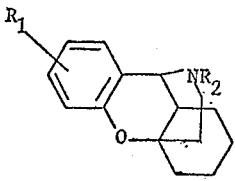

are disclosed, wherein $R_1$ is a functional group, such as hydroxy, lower alkoxy, etc.; $R_2$ is hydrogen, lower alkyl, aralkyl, etc. These compounds are useful as hypotensive agents.

---

This invention relates to novel heterocyclic compounds and more particularly this invention relates to iminoethanoxanthenes of the formula:

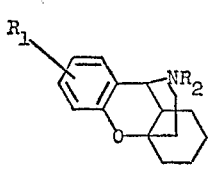

wherein $R_1$ represents hydrogen, hydroxy, lower alkoxy such as methoxy, ethoxy, propoxy, isopropoxy and the like or substituted lower alkoxy in which lower alkoxy has the same meaning as defined such as dilower alkylamino substituted lower alkoxy, such as dimethylaminoethoxy, diethylaminoethoxy, dimethylaminopropoxy and heterocyclic amino substituted alkoxy such as piperidinoethoxy, morpholinoethoxy and pyrrolidinoethoxy; $R_2$ represents hydrogen, lower alkyl of 1 to 6 carbon atoms such as methyl, ethyl, propyl, isopropyl, butyl, isobutyl and the like, aralkyl such as phenyl lower alkyl, in which lower alkyl has the same meaning as defined, substituted lower alkyl, in which lower alkyl has the same meaning as defined, such as hydroxyethyl and the like, substituted aralkyl such as phenyl lower alkyl in which the phenyl ring may be substituted with halogen, nitro, lower alkoxy and the like, acyl of a carboxylic acid such as acetyl, propionyl, benzoyl and the like, carboxamidino or amidinocarboxamidino The term "halogen" includes all the four members, i.e. iodine, bromine, fluorine and chlorine.

The symbols $R_1$ and $R_2$ as used hereinafter have the same meaning as defined.

This invention also embraces within its scope novel processes for the production of the above compounds as well as intermediates useful for the production of these compounds.

The compounds of this invention form salts with therapeutically acceptable acids and these acid addition salts are also included within the scope of this invention.

The compounds of this invention are useful as hypotensive and analgetic agents. For use as a hypotensive, the compounds of this invention are combined with known pharmaceutical carriers such as lactose, dicalcium phosphate and the like to form dosage forms such as tablets. They may also be combined with other materials such as syrup, distilled water and the like to form dosage forms such as solutions for injection or suspensions for oral administration.

Generally speaking, a dose of about 0.1 mg. to 15 mg. in several daily doses is needed to produce hypotension. In addition, the 1,2,3,4,5,6,7,8-octahydro-1-(o-hydroxyphenyl)-isoquinoline intermediates described herein are useful as central nervous system stimulants.

According to the process of this invention the novel compounds of this invention may be prepared by a number of processes. The first method involves the cyclization of 1-(o-hydroxyphenyl) - 1,2,3,4,5,6,7,8 - octahydroisoquinoline or double bond isomers thereof or ether or ester derivatives thereof. This isoquinoline and its derivatives may be represented by the formula:

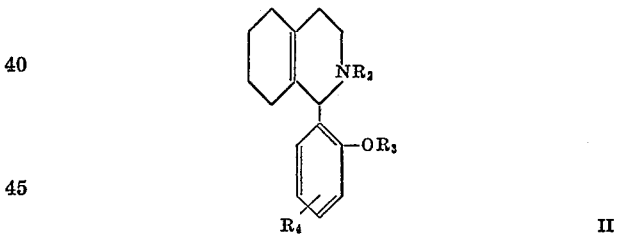

wherein $R_2$ has the same meaning as defined; $R_3$ is hydrogen, lower alkyl or acyl and $R_4$ is hydrogen, lower alkoxy or acyloxy.

The reaction is effected at elevated temperature such as from 100 to 200° C. in the presence of an acidic condensing agent, preferably concentrated hydrobromic acid at its boiling point, to give the novel compounds of this invention, having the formula:

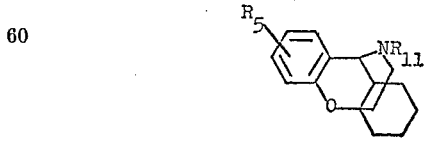

wherein $R_{11}$ is hydrogen, lower alkyl or aralkyl and $R_5$ is hydrogen or hydroxy.

The second method for preparing compound III involves cyclization of an N-(α-chlorobenzyl)-cyclohexenylethylamine salt, having the formula:

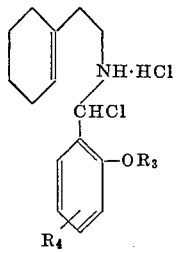

IV employing reaction conditions analogous to those described above, i.e. employing elevated temperature in the presence of an acidic condensing agent such as hydrobromic acid.

This alternate route is generally preferred where applicable because of the convenience of the reaction and because of the fact that the starting material need not be extensively purified prior to final cyclization.

A third route to the novel compounds of this invention involves the thermal cyclization of Schiff base hydrochlorides, having the formula:

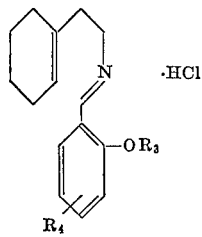

V wherein $R_3$ and $R_4$ have the same meaning as previously defined.

This reaction is also effected at elevated temperature employing an inert high-boiling heat transfer medium such as that available under the trade name Dowtherm A, at a temperature from about 175 to 300° C. to obtain those compounds of this invention wherein $R_2$ is hydrogen.

The novel intermediates useful for the production of these compounds may be obtained in accordance with the following reaction scheme:

SCHEME A

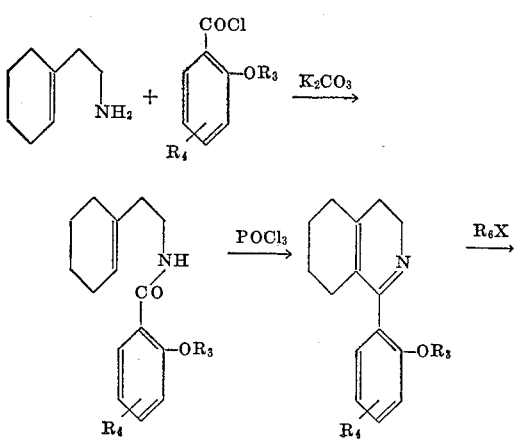

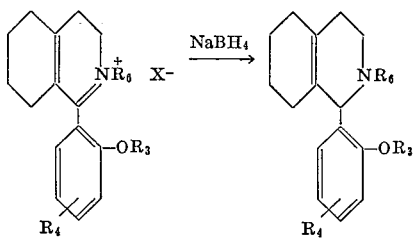

wherein $R_6$ is lower alkyl or aralkyl such as phenyl lower alkyl.

In the first step of the reaction as described in Scheme A above, 2-(cyclohexen-1-yl)ethylamine is treated with a substituted 2-alkoxybenzoyl chloride in the presence of potassium carbonate at a temperature of about 10 to 20° C. The reaction product thus obtained is then cyclized with phosphorus oxychloride to yield the compound having an isoquinoline nucleous. Quaternization of this isoquinoline compound with an alkyl halide followed by reduction, such as with sodium or potassium borohydride, produces the desired intermediate corresponding to Formula II above.

An alternate pathway for the production of the intermediate compound is illustrated in Scheme B below:

SCHEME B

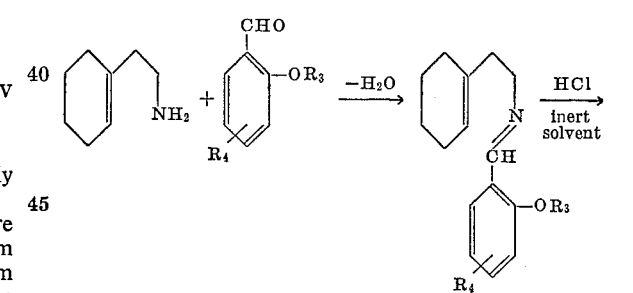

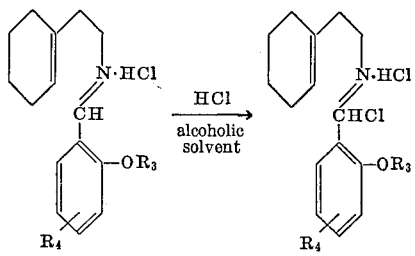

In this reaction, 2-(cyclohexen-1-yl)ethylamine is treated with substituted 2-alkoxy benzaldehyde to yield an intermediate Schiff base which is treated with hydrogen chloride, first in a non-polar solvent followed by treatment with hydrogen chloride in an alcoholic solvent to yield compound IV.

The novel compounds of this invention in which $R_2$ is hydrogen can be converted to other new and novel compounds in accordance with the reaction scheme described below:

SCHEME C

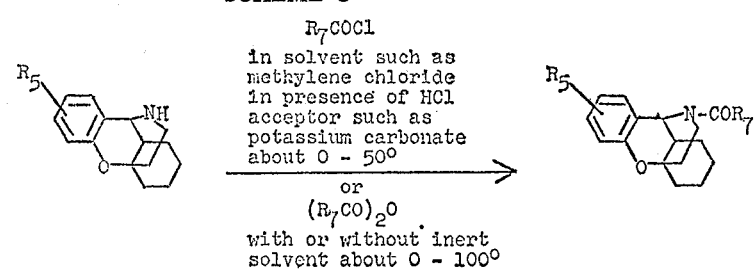

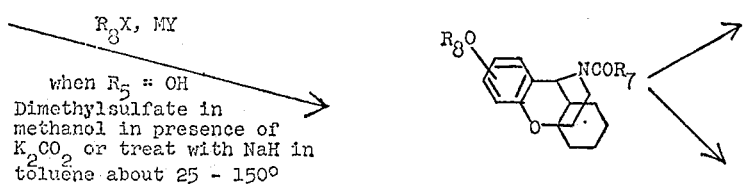

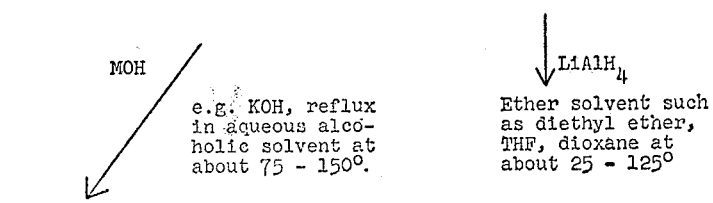

---

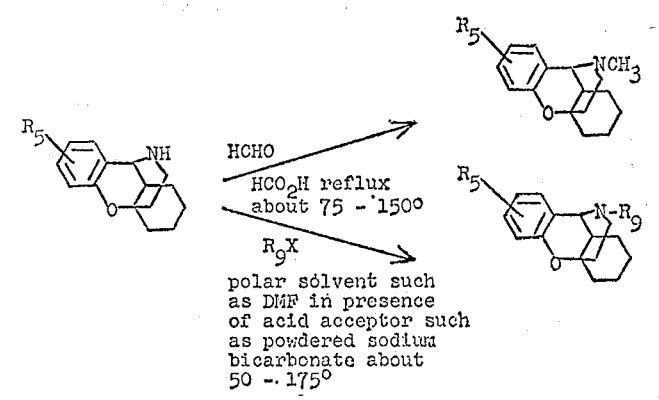

---

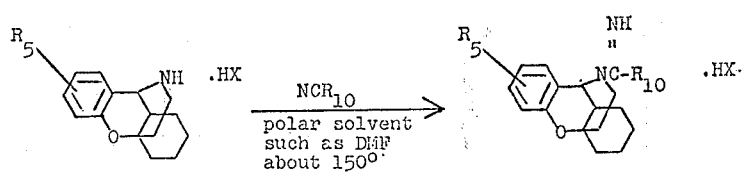

wherein $R_5$=Has the previous meaning.
$R_7$=Lower alkyl or cycloalkyl.
$R_8$=Lower alkyl or diloweralkylaminoloweralkyl.
$R_9$=Lower alkyl, aralkyl or substituted lower alkyl, such as $CH_2COC_6H_5$ (in the latter case, subsequent reduction, e.g. sodium or potassium borohydride in methanol at 0–80°, furnishes the compound where $R_9$ is $CH_2CH(OH)C_6H_5$).
$R_{10}$=Amino or guanidino.
X=Halogen or sulfate.

M=Alkali metal such as sodium or potassium.
Y=Basic anion such as hydride, carbonate, or hydroxide.

Acid addition salts of the subject compounds are readily prepared by the usual methods, such as, for example, the reaction of a stoichiometrically equivalent amount of the base and the desired acid in an inert common solvent. Examples of acids which are suitable for the preparation of acid addition salts of the amine base of this invention are inorganic acids, such as, for example, hydrochloric nitric, sulfuric, phosphoric, and the like acids, and organic acids, such as, for example, benzoic, acetic, salicylic, maleic, tartaric, citric and the like acids. The preferred salts are those which are pharmaceutically acceptable, that is, they are acid addition salts which are no more toxic than the bases from which they are prepared and which possess the necessary physical properties that render them suitable for incorporation into dosage forms in combination with the desired pharmaceutical carriers.

The following examples are included in order further to illustrate the invention. All temperatures are given in degrees centigrade. Room temperature is from about 20 to 30° C. Skellysolve B and C used in these examples is essentially n-hexane and n-heptane respectively.

METHOD 1

Example A

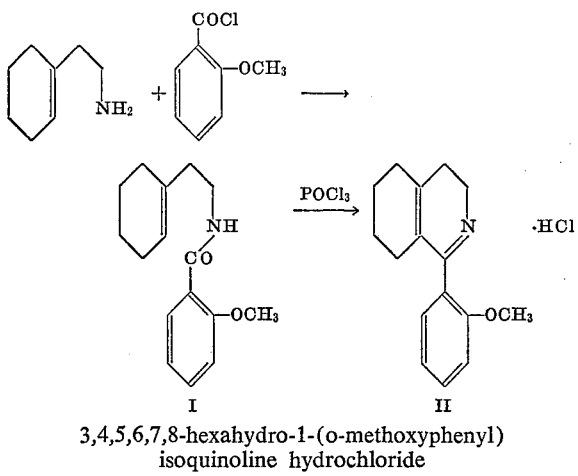

3,4,5,6,7,8-hexahydro-1-(o-methoxyphenyl)
isoquinoline hydrochloride

A solution of 100 g. (0.59 mole) of o-methoxybenzoyl chloride in 300 ml. of methylene chloride is added to a stirred mixture of 81.4 g. (0.65 mole) of 2-(cyclohexen-1-yl)ethylamine, 300 ml. of methylene chloride, 200 g. of potassium carbonate and 300 ml. of water, keeping the reaction temperature under 20°. The mixture is stirred for 3 hrs. at room temperature, separated and the methylene chloride phase is washed sequentially with water, dilute acid and water. After drying (potassium carbonate), the methylene chloride is evaporated, leaving 151 g. (quantitative) of the amide (I) which is used directly in the next step.

A solution of 60 g. (about 0.23 mole) of the crude amide (I) and 200 ml. of phosphorous oxychloride is refluxed for 4 hrs., then allowed to stand overnight. The mixture is partially evaporated under reduced pressure and the residue is diluted with 600 ml. of ice-water. The resulting aqueous solution is made strongly basic with alkali and extracted with 1 l. of ether. The ether solution, after drying (potassium carbonate) and treatment with charcoal, is evaporated, leaving the crude isoquinoline (II). Distillation of this crude base gives II as an orange oil with B.P. 142–155°/0.4 mm.

A sample of this distillate in ether is treated with excess hydrogen chloride to precipitate the salt as an oil. Three recrystallizations from 2-propanol-ether furnishes an analytical sample of 1-(o-methoxyphenyl)hexahydro-isoquinoline, M.P. 195–197°; $\gamma^{\text{Nujol}}$ 2350, 1990, 1960 (NH+); 1670, 1590 sh (C=N+) cm.$^{-1}$.

Analysis for $C_{16}H_{19}NO \cdot HCl$.—Calcd.: C, 69.18; H, 7.26; N, 5.04. Found: C, 69.39; H, 6.97; N, 4.83.

Example B

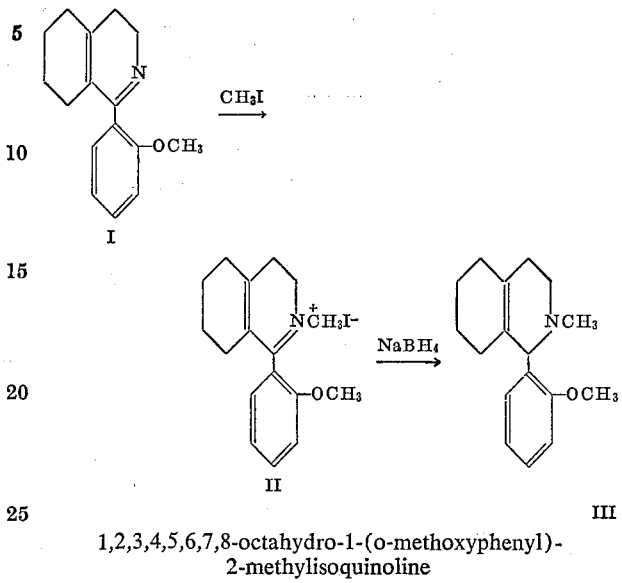

1,2,3,4,5,6,7,8-octahydro-1-(o-methoxyphenyl)-
2-methylisoquinoline

A solution of 24.1 g. (0.1 mole) of 3,4,5,6,7,8-hexahydro-1-(o-methoxyphenyl)isoquinoline (I) in 75 ml. of methyl iodide is refluxed for 1 hr., cooled, evaporated and the last traces of methyl iodide are removed by co-distillation with two small portions of ethanol. The remaining methiodide (II), a reddish gum, is dissolved in 200 ml. of absolute ethanol and stirred in an ice-bath while 3.7 g. (0.1 mole) of sodium borohydride is added. The resulting mixture is stirred 2 hrs. at room temperature and evaporated to a small volume under reduced pressure. The residue is diluted with water and extracted with 250 ml. of ether. After drying (potassium carbonate), evaporation of the ether yields the crude product as a viscous oil. Recrystallization from petroleum ether gives II as a solid, M.P. 51–84°. Two more recrystallizations from petroleum ether furnish an analytically pure sample of 1,2,3,4,5,6,7,8-octahydrophenyl-1-(o-methoxyphenyl)-2-methylisoquinoline, M.P. 86–88°;

$\lambda_{\text{max.}}^{\text{EtOH}}$ m$\mu$ ($\epsilon$) 274 (2760), 280 (2640); $\nu^{\text{Nujol}}$ 2790 (NCH$_3$) cm.$^{-1}$.

Analysis for $C_{17}H_{23}NO$.—Calcd.: C, 79.34; H, 9.01; N, 5.44. Found: C, 79.51; H, 9.14; N, 5.18.

Example C

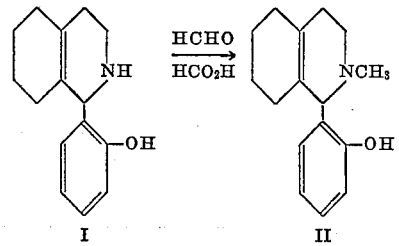

1,2,3,4,5,6,7,8-Octahydro-1-(o-hydroxyphenyl)-2-
methylisoquinoline

A solution of 7 g. (0.03 mole) of 1,2,3,4,5,6,7,8-octahydro-1-(o-hydroxyphenyl)isoquinoline, 4.9 g. (0.06 mole) of 37% aqueous formaldehyde and 50 ml. of 98% formic acid is heated on the steam bath for 4 hrs., cooled and evaporated. The residue is dissolved in water and the resulting solution is made basic with sodium bicarbonate and extracted with ether. After drying (magnesium sulfate) the ether is evaporated leaving the crude product II as a viscous oil. This is taken up in petroleum ether and treated with a slight excess of hydrogen chloride to give a semisolid salt. After decanting the solvent, the salt is dissolved in water and treated again with bicarbonate. The resulting base is extracted into ether and, after drying (magnesium sulfate) and charcoal treatment, the ether is evaporated. The residue is dissolved in 50 ml. of methanol and diluted with 10 ml. of 10 M potassium hydroxide and 100 ml. of water. The resulting oil is extracted into ether and, after washing with water and drying (magnesium sulfate), the ether is evaporated to give octahydro - 1 - (o-hydroxyphenyl) - 2 - methylisoquonoline (II) as an oil which slowly crystallizes to a solid, M.P. 52–60°;

$\lambda_{max}^{EtOH}$ m$\mu$ ($\epsilon$) 275 (2780), 280 sh (2720) cm.$^{-1}$.

Analysis for $C_{16}H_{21}NO$—Calcd: C, 78.97; H, 8.70; N, 5.76. Found: C, 78.75; H, 8.85; N, 5.49.

Example D

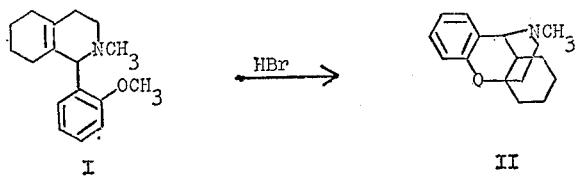

1,2,3,4,9,9a-hexahydro-11-methyl-9,4a-iminoethano-4aH-xanthene (A) Acid cyclization of 1-(o-methoxyphenyl)-2-methyloctahydroisoquinoline: A solution of 9 g. (0.037 mole) of 1-(o-methoxyphenyl)-2-methyl-1,2,3,4,5,6,7,8-octahydroisoquinoline (I) in 100 ml. of 48% hydrobromic acid is refluxed for 2 hrs., cooled, and evaporated in vacuo to near dryness. The residue is diluted with 200 ml. of water made strongly basic with alkali and extracted with 300 ml. of ether. After drying (potassium carbonate) the ether is evaporated, leaving the product (II) as a semisolid (7.0 g.). Two recrystallizations of the crude product from petroleum ether give compound II, M.P. 91–94°;

$\lambda_{max}^{EtOH}$ m$\mu$ ($\epsilon$) 218–224 (4300), 276 (1430), 284 (1420); $\lambda_{max}^{Nujol}$ 945 cm.$^{-1}$.

Analysis for $C_{16}H_{21}NO$—Calcd.: C, 78.97; H, 8.70; N, 5.76. Found: C, 79.06; H, 8.87; N, 5.59.

(B) By methylation of hexahydro-9,4a-iminoethano-4aH-xanthene

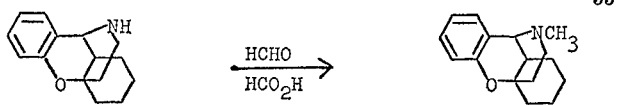

A solution of 16.2 g. (0.071 mole) of 1,2,3,4,9,9a-hexahydro-9,4a-iminoethano-4aH-xanthene and 17 g. (0.075 mole) of 37% aqueous formaldehyde in 100 ml. of 98% formic acid is heated on the steam bath for one hour, cooled and evaporated to near dryness. The residue is diluted with 150 ml. of water, filtered from trace amounts of solids and made strongly basic with alkali. The product is extracted into 600 ml. of ether and the ether solution, after drying (potassium carbonate) and charcoal treatment, is evaporated to a small volume. Addition of a small amount of petroleum ether causes crystallization to begin. Filtration gives the N-methyl compound II, M.P. 90–93°, identical in all respects with material prepared via Method A.

METHOD 2

Example A

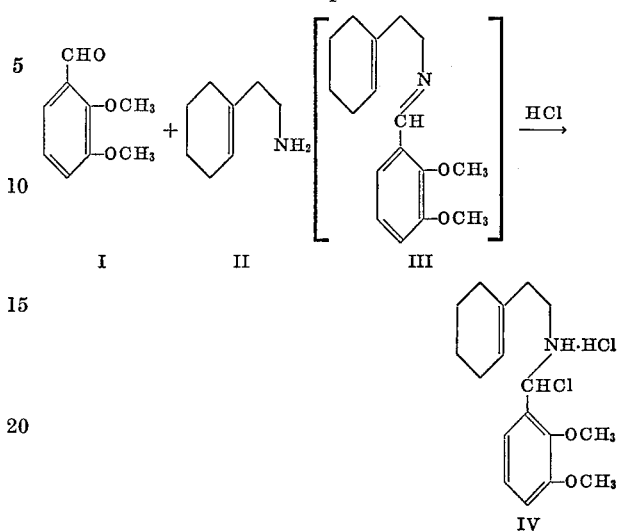

α-Chloro-N-[2-(cyclohexen-1-yl)ethyl]-2,3-dimethoxybenzylamine hydrochloride

A solution of 100 g. (0.60 mole) of 2,3-dimethoxybenzaldehyde (I) and 70 g. (0.56 mole) of 2-(cyclohex-1-en-1-yl)-ethylamine (II) in 600 ml. of benzene is refluxed for 1 hr., removing the water formed by azeotropic distillation. After this period, the theoretical amount of water has been collected. The cooled benzene solution of the Schiff base (III) is diluted with 800 ml. of ether and treated with an excess of hydrogen chloride at ice-bath temperature to precipitate the hydrochloride of III. Filtration gives the intermediate salt, M.P. 60–160°. A mixture of 70 g. of this salt and 400 ml. of absolute ethanol is treated with excess hydrogen chloride and refluxed for 2 hrs. After cooling, the solid (IV) is filtered and washed with ethanol, then ether, to give the α-chloro hydrochloride (IV), M.P. 199–201°. Recrystallization from methanol-ether furnishes an analytical sample of α-chloro-N-[2-(cyclohexen-1-yl)ethyl]-2,3-dimethoxybenzylamine hydrochloride (IV), M.P. 199–201°.

Analysis for $C_{17}H_{24}ClNO_2 \cdot HCl$—Calcd.: C, 58.96; H, 7.28; N, 4.05; Cl, 21.42. Found: C, 59.19; H, 7.58; N, 4.19; Cl, 21.16, 21.48, 21.45.

Example B

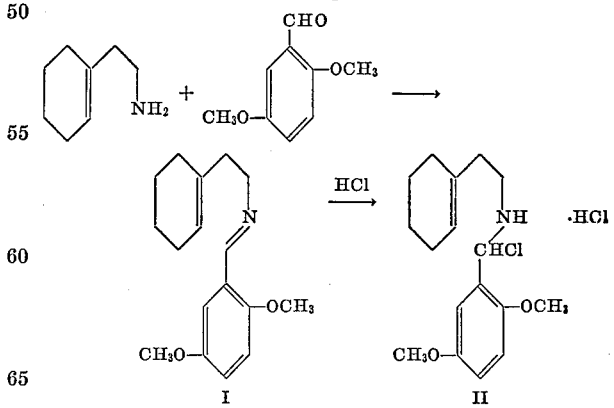

α-Chloro-N-[2-(cyclohexen-1-yl)ethyl]-2,5-dimethoxybenzylamine hydrochloride

A solution of 21 g. (0.17 mole) of 2-(cyclohexen-1-yl)-ethylamine and 30 g. (0.18 mole) of 2,5-dimethoxybenzaldehyde in 300 ml. of benzene is refluxed for 1 hr. under a Dean-Stark trap, producing an equivalent amount of water. After cooling, the benzene solution of the Schiff base (I) is diluted with 100 ml. of 2-propanol and treated with a large excess of hydrogen chloride, allowing the temperature to rise. The mixture is then evaporated to about 300 ml. by distillation at atmospheric pressure and the hot solution is diluted to about 900 ml. with ether. On cooling, the salt (II) precipitates. Filtration gives product (II), M.P. 192–193°. Recrystallization from ethanol-ether furnishes an analytical sample, M.P. 194–195°;

$\nu_{max.}^{Nujol}$ 2400–2800 (NH+) cm.$^{-1}$.

Analysis for $C_{17}H_{24}NO_2Cl \cdot HCl$.—Calcd.: C, 58.96; H, 7.28; N, 4.01. Found: C, 59.05; H, 7.32; N, 3.86.

Example C

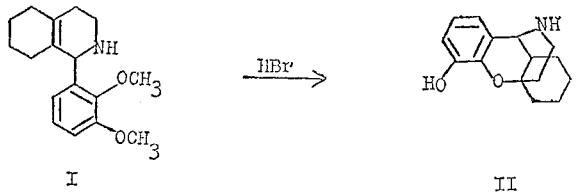

1,2,3,4,9,9a-hexahydro-9,4a-iminoethano-4aH-xanthen-5-ol

Method A.—From 1-(2,3-dimethoxyphenyl)-1,2,3,4,5,6,7,8-octahydroisoquinoline: A solution of 3 g. (0.011 mole) of 1-(2,3-dimethoxyphenyl)-octahydroisoquinoline (I) in 25 ml. of 48% hydrobromic acid is refluxed for 3 hrs., cooled and evaporated to dryness. The residue is dissolved in water and the resulting solution made basic with aqueous sodium bicarbonate and extracted with methylene chloride. After drying (magnesium sulfate) the methylene chloride is evaporated to give the tetracyclic phenol (II), M.P. 223–225°. Recrystallization from ethyl acetate furnishes an analytical sample, M.P. 224–226°;

$\lambda_{max.}^{MeOH}$ m$\mu$ ($\epsilon$) 222 sh (7600), 284 (2640); $\nu_{max.}^{Nujol}$ 3250 (OH), 2550 (HNH), 940 cm.$^{-1}$ Analysis for $C_{15}H_{19}NO_2$.—Calcd.: C, 73.44; H, 7.81; N, 5.71. Found: C, 73.39; H, 7.72; N, 5.45.

Method B.—From α-chloro-N-[2-(cyclohexen-1-yl)ethyl]-2,3-dimethoxybenzylamine hydrochloride:

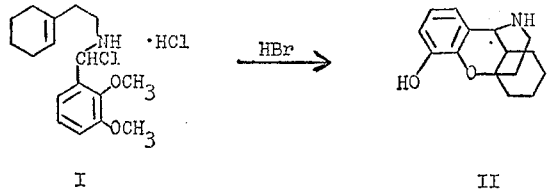

A total of 39 g. (0.11 mole) of α-chloro-N-[2-(cyclohexen-1-yl)ethyl]-2,3-dimethoxybenzylamine hydrochloride (I) is added in small portions to 250 ml. of 48% hydrobromic acid held at 100° throughout the addition. The resulting mixture is then heated at reflux for 3 hrs. after the solid has dissolved, then cooled. After standing overnight, crystallization is induced by scratching. The mixture is filtered and the solid washed wth 2-propanol-ether, then ether, to give the hydrobromide salt of the tetracyclic phenol (II), M.P. 214–216°. A portion of this salt is converted to the free base with bicarbonate; the resulting material is identical in all respects with material prepared by method A.

A second portion of the salt obtained above is recrystallized twice from methanol-ether to give the analytically pure hydrobromide hemimethanolate, M.P. 214–216°;

$\lambda_{max.}^{EtOH}$ m$\mu$ ($\epsilon$) 223 (7180), 285 (3160); $\nu_{max.}^{Nujol}$ 3550, 3450, 3300 (OH); 2700, 2650, 2580, 2420 (NH+); 925 cm.$^{-1}$.

Analysis for $C_{15}H_{19}NO_2 \cdot HBr \cdot \frac{1}{2}CH_3OH$.—Calcd.: C, 54.40; H, 6.48; N, 4.09; Br, 23.35. Found: C, 54.38; H, 6.50; N, 4.25; Br, 23.65.

Method C.—From 11-acetyl-1,2,3,4,9,9a-hexahydro-9,4a-iminoethane-4aH-xanthen-5-ol:

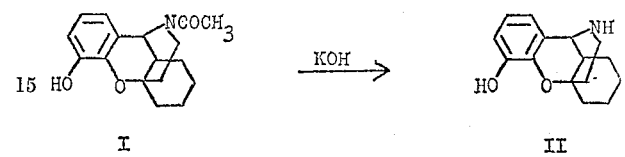

A solution of 9.5 g. (0.033 mole) of 11-acetyl-1,2,3,4,9,9a-hexahydro-9,4a-iminoethano-4aH-xanthen-5-ol, 75 ml. of aqueous 10 M potassium hydroxide and 200 ml. of methanol is refluxed for 18 hrs., most of the methanol is distilled off and the remaining mixture is heated at 100° for 2 days. The pH of the cooled solution is adjusted to about 7.5 by the addition of dilute hydrochloric acid. The resulting solid is filtered and slurried with 200 ml. of 1 N hydrochloric acid and 100 ml. of water. After filtering from some undissolved solids, the acid solution is made slightly basic with ammonium hydroxide to precipitate the deacetylated phenol. Filtration gives 1,2,3,4,9,9a-hexahydro-9,4a-iminoethano-4aH-xanthen-5-ol, M.P. 223–225°, identical in all respects with an authentic sample prepared by method A.

Example D

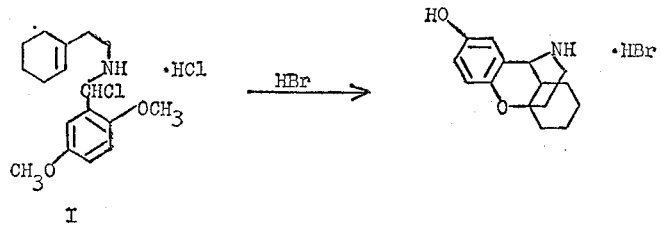

1,2,3,4,9,9a-hexahydro-9,4a-iminoethano-4aH-xanthen-7-ol hydrobromide

A 25 g. (0.0723 mole) sample of the Schiff base-hydrogen chloride adduct (I) is added to 200 ml. of 48% hydrobromic acid held at 100° with stirring. The solution is refluxed for 3 hrs., then cooled. The precipitate salt (II) is filtered and washed sequentially with concentrated hydrobromic acid, 2-propanol and petroleum ether, giving II, M.P. 160–230°. The product is recrystallized from ethanol-ether, then from 2-propanol to give an analytical sample, M.P. 291–293°;

$\lambda_{max.}^{EtOH}$ m$\mu$ ($\epsilon$) 231 (7760), 303 (3660); $\nu_{max.}^{Nujol}$ 3300 (OH,) 2430, 2600 (NH+), 942 cm.$^{-1}$ Analysis for $C_{15}H_{19}NO_2 \cdot HBr$.—Calcd.: C, 55.23; H, 6.18; N, 4.29. Found: C, 55.13; H, 6.22; N, 4.14.

METHOD 3

Example A

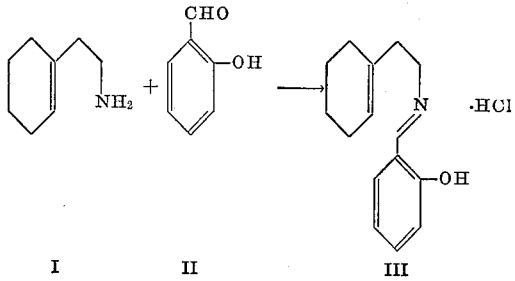

N-salicylidene-2-(cyclohexen-1-yl)ethylamine hydrochloride

A solution of 25.2 g. (0.02 mole) of 2-(cyclohexen-1-yl)-ethylamine (I) and 26.8 g. (0.022 mole) of salicyl-aldehyde (II) in 300 ml. of benzene is refluxed for 1 hr. under a Dean-Stark trap to give the theoretical amount of water. The cooled solution of the Schiff base is treated with excess hydrogen chloride to precipitate the crude salt (II), which crystallizes on addition of ether. Filtration gives II, M.P. 104–112°. Two recrystallizations from 2-propanol-ether furnish analytically pure N-salicylidene-2-(cyclohexen-2-yl)ethylamine hydrochloride (III), M.P. 123–124°.

Analysis for $C_{15}H_{19}NO \cdot HCl$.—Calcd.: C, 67.79; H, 7.55; N, 5.27; Cl, 13.34. Found: C, 67.74; H, 7.60; N, 5.05; Cl, 13.41, 13.46.

Example B

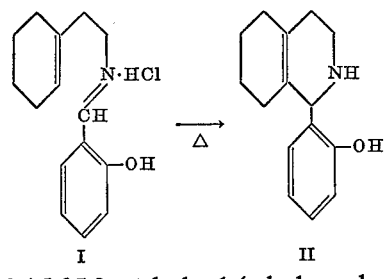

I    II 1,2,3,4,5,6,7,8-octahydro-1-(o-hydroxyphenyl)isoquinoline

Method A.—Thermal cyclization of N-salicylidene-2-(cyclohexene-1-yl)ethylamine hydrochloride: A 40 g. (0.132 mole) portion of N-salicylidene-2-(cyclohexen-1-yl)ethylamine hydrochloride (I) is fused in an oil bath at 200–210° for 30 minutes. After cooling, the glassy residue is dissolved in 300 ml. of water, treated with charcoal, and the clarified solution is made basic with aqueous sodium bicarbonate. The crude solid which separates is extracted into ether. After drying (sodium sulfate) the ether is evaporated, leaving the crude product as a semisolid. Recrystallization from Skellysolve C gives the isoquinoline (II), M.P. 127–130°.

Further recrystallization gives analytically pure 1,2,3,4,5,6,7,8-octahydro-1-(o-hydroxyphenyl)isoquinoline (II), M.P. 132–133°;

$\lambda_{max.}^{EtOH}$ m$\mu$ ($\epsilon$) 275 (2820), 280 sh (2700); $\nu_{max.}^{Nujol}$ 3300 (OH), no peaks between 920–960 cm.$^{-1}$.

Analysis for $C_{15}H_{19}NO$.—Calcd.: C, 78.56; H, 8.35; N, 6.11. Found: C, 78.81; H, 8.65; N, 6.19.

Method B.—From 1,2,3,4,6,7,8,8a-octahydro-1-(o-hydroxyphenyl)-isoquinoline:

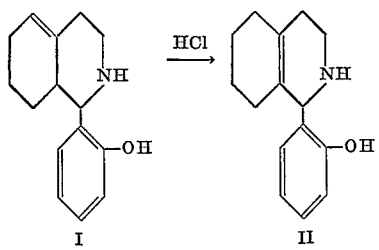

I    II

A mixture of 14.5 g. (0.063 mole) of 1,2,3,4,6,7,8,8a-octahydro-1-(o-hydroxyphenyl)-isoquinoline (I), 150 ml. of concentrated hydrochloric acid and 200 ml. of methanol is refluxed for 2 hrs., cooled and evaporated to remove most of the solvents. The residue is dissolved in 1 l. of water and the resulting solution is basified to pH 8. The resulting solid is extracted into ether and, after drying (magnesium sulfate), the ether is evaporated, leaving the crude product (II) as a semisolid. Repeated recrystallizations from Skellysolve C give the isomeric 1,2,3,4,5,6,7,8-octahydro-1-(o-hydroxyphenyl)isoquinoline, M.P. 130– 132°, identical in all respects to material prepared via method A.

Example C

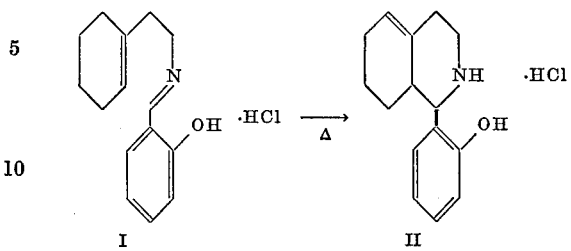

I    II 1,2,3,4,6,7,8,8a-octahydro-1-(o-hydroxyphenyl)isoquinoline hydrochloride A mixture of 135 g. of N-salicylidene-2-(cyclohexen-1-yl)-ethylamine hydrochloride and 300 ml. of Dorotherm A is heated at 110° until all the solid dissolves. The solution is then heated to 180–190° and held at this temperature for 3 hrs. After cooling, the mixture is diluted with 1 l. of ether and extracted with 1 l. of water. The aqueous solution is made basic with sodium bicarbonate and extracted with 2 l. of ether. After drying (magnesium sulfate) the ether is evaporated, leaving the product as an oil. Crystallization from Skellysolve C then gives the free base of II, M.P. 76–85°. Two more recrystallizations of the first crop from Skellysolve C give the pure free base of II, M.P. 89–90°. After recrystallization of the crude salt from methanol-ether, pure 1,2,3,4,6,7,8,8a-octahydro-1 - (o - hydroxyphenyl)-isoquinoline hydrochloride, M.P. 256–258°, is obtained;

$\lambda_{max.}^{EtOH}$ m$\mu$ ($\epsilon$) 214 sh (7320), 276–279 (2930); $\nu_{max.}^{Nujol}$ 3100 (OH), 2400, 2550 (NH$_2^+$), 1655 (C=C) cm.$^{-1}$.

Analysis for $C_{15}H_{19}NO \cdot HCl$.—Calcd.: C, 67.79; H, 7.58; N, 5.27. Found: C, 67.90; H, 7.71; N, 5.34.

Example D

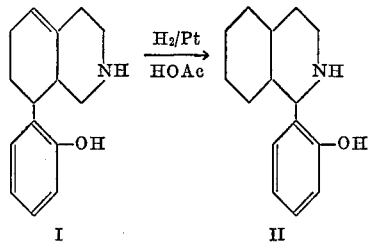

I    II

Decahydro-1-(o-hydroxyphenyl)isoquinoline

A solution of 22.9 g. (0.1 mole) of 1-(o-hydroxyphenyl)-1,2,3,4,6,7,8,8a-octahydroisoquinoline (I) in 200 ml. of absolute ethanol and 40 ml. of acetic acid is hydrogenated at room temperature over 1 g. of platinum oxide at an initial hydrogen pressure of 45 p.s.i. (in the absence of acid, no hydrogen is absorbed). After 18 hrs. the slow uptake of hydrogen is completed. The mixture is filtered, and evaporated to near dryness. The residue is diluted with 150 ml. of water and made basic (pH 8) with sodium bicarbonate solution. The resulting oil is extracted into 500 ml. of ether and this solution, after drying (magnesium sulfate), is evaporated, leaving 16 g. of crude product (II), a solid M.P. 85–92°. A petroleum ether solution of this material is treated with charcoal, filtered and evaporated to furnish II. Two recrystallizations from Skellysolve B then furnish an analytically pure sample of the decahydroisoquinoline II, M.P. 101–102°;

$\lambda_{max.}^{EtOH}$ m$\mu$ ($\epsilon$) 216 sh (7200), 275 (2570), and 279 sh (2510); $\nu_{max.}^{Nujol}$ 3270 (OH), 2600 (NH) cm.$^{-1}$.

Analysis for $C_{15}H_{21}NO$.—Calcd.: C, 77.88; H, 9.15; N, 6.05. Found: C, 77.85; H, 9.21; N, 5.97.

Example E

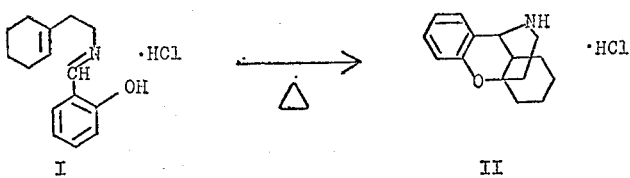

1,2,3,4,9,9a-hexahydro-9,4a-iminoethane-4aH-xanthene hydrochloride

Method A.—Thermal cyclization of N-salicylidene-2-(cyclohexen-1-yl)ethylamine hydrochloride (I): From the fusion of 40 g. (0.132 mole) of N-salicylidene-2-(cyclohexen-1-yl)ethylamine hydrochloride for 30 min. at 200–210°, 7.2 g. of the related isoquinoline is obtained by crystallization of the crude, bicarbonate-insoluble product from Skellysolve C. The filtrate from this crystallization is evaporated to leave 24 g. of a semisolid residue. A portion of this material (19 g.) is dissolved in 20 ml. of methanol; this solution is then diluted with 20 ml. of 10 M potassium hydroxide and 150 ml. of water. The alkali-insoluble material is extracted into 300 ml. of ether. The ether solution, after treatment with charcoal, is evaporated, leaving 15 g. of an oil. Distillation of this residue furnishes an oily fraction, B.P. 129–131°/0.7 mm. which is dissolved in ether and treated with excess hydrogen chloride. The viscous salt which precipitates crystallizes on addition of 2-propanol to give the crude tetracyclic salt (II) on filtration. Recrystallization from 2-propanol-ether then furnishes the pure 1,2,3,4,9,9a - hexahydro-9,4a-iminoethano-4aH-xanthene hydrochloride (II), M.P. 276–278°;

$\lambda_{max.}^{EtOH}$ m$\mu$ ($\epsilon$) 217 (6720), 223 (6980), 277 (2470), 284 (2390); $\nu_{max.}^{Nujol}$ 2700, 2600, 2550 (NH$^+$), 945 cm.$^{-1}$.

Analysis for $C_{15}H_{19}NO \cdot HCl$.—Calcd.: C, 67.79; H, 7.58; N, 5.27. Found: C, 67.71; H, 7.80; N, 5.14.

Method B.—From 1,2,3,4,5,6,7,8-octahydro-1-(o-hydroxyphenyl)isoquinoline:

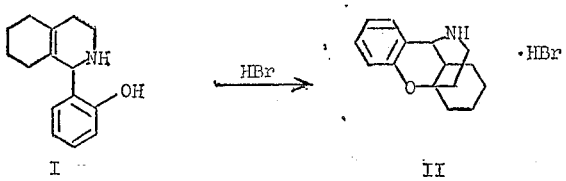

A solution of 10 g. (0.044 mole) of 1,2,3,4,5,6,7,8-octahydro-1-(o-hydroxyphenyl)isoquinoline (I) in 50 ml. of concentrated hydrobromic acid is refluxed for 90 min. On cooling, the hydrobromide of II precipitates which is recovered by filtration, M.P. 257–260°.

A small sample is converted to the base with potassium hydroxide. This is shown to be identical to a sample of the oily base prepared from the analytically pure hydrochloride.

The same material is also obtained, under similar conditions, starting with a mixture of the isomeric 1,2,3,4,5,6,7,8- and 1,2,3,4,6,7,8,8a-octahydro - 1 - (o-hydroxyphenyl)-isoquinolines.

N-ACYLATION

Example A

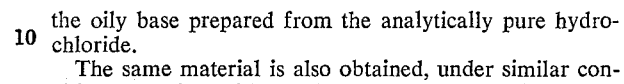

11-acetyl-1,2,3,4,9,9a-hexahydro-9,4a-iminoethano-4aH-xanthen-5-ol

Acetic anhydride (200 ml.) is mixed with 17 g. (0.07 mole) of the secondary amine I to give a mildly exothermic reaction. The solid (I) dissolves completely and, after a few minutes the product begins to crystallize. After one-half hour, the cooled mixture is filtered and the product washed with acetic anhydride. The crude product is then slurried with warm water to remove excess anhydride and the aqueous mixture is filtered after cooling to give the N-acetyl derivative II, M.P. 207–209°. Two recrystallizations from 2-propanol then furnish the pure amide (II), M.P. 207–209°;

$\lambda_{max.}^{EtOH}$ m$\mu$ ($\epsilon$) 282 (2660), 288 sh (2560); $\nu_{max.}^{Nujol}$ 3050 (OH), 1625 (C=O), 742 cm.$^{-1}$.

Analysis for $C_{18}H_{21}NO_3$.—Calcd.: C, 71.05; H, 7.37; N, 4.87. Found: C, 71.15; H, 7.48; N, 4.92.

Example B

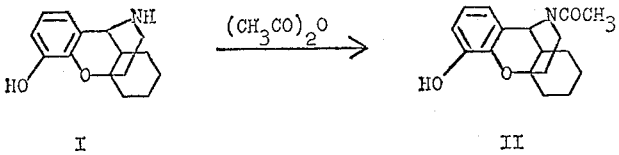

11-cyclopropylcarbonyl-1,2,3,4,9,9a-hexahydro-9,4a-iminoethano-4aH-xanthene

To a solution of 11.5 g. (0.05 mole) of the secondary amine I in 200 ml. of methanol, there is added a solution of 30 g. of potassium carbonate in 30 ml. of water. To the resulting slurry is added 15.7 g. (0.15 mole) of cyclopropanecarbonyl chloride, keeping the temperature of the mixture below 30° by means of an ice bath. The mixture is stirred overnight at room temperature, then evaporated in vacuo to remove most of the methanol. The residue is diluted with water and extracted into 500 ml. of ether. The ether extract is washed with dilute acid and water, then dried (magnesium sulfate) and evaporated, leaving the amide (II) as a crystalline solid, M.P. 127–129°. Recrystallization from Skellysolve C then gives an analytical sample of II, M.P. 129–131°;

$\lambda_{max.}^{EtOH}$ m$\mu$ ($\epsilon$) 277 (2960), 284 (2900); $\nu_{max.}^{Nujol}$ 1630 (C=O), 943 cm.$^{-1}$.

Analysis for $C_{19}H_{23}NO_2$.—Calcd.: C, 76.73; H, 7.80; N, 4.71. Found: C, 76.90; H, 7.85; N, 4.64.

Example C

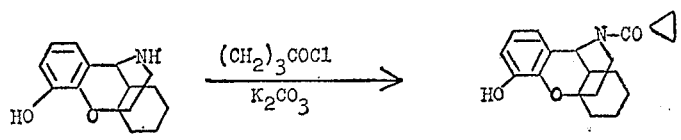

11-cyclopropylcarbonyl-1,2,3,4,9,9a-hexahydro-9,4a-iminoethano-4aH-xanthen-5-ol A mixture of 8 g. (0.033 mole) of the secondary amine I and 10 g. of potassium carbonate in 100 ml. of methanol and 15 ml. of water is stirred at 15° while 8 g. (0.09 mole) of cyclopropylcarbonyl chloride is added rapidly. The mixture is stirred at room temperature for 2 hrs., then allowed to stand overnight. The methanol is removed in vacuo and the residue is diluted with 150 ml. of water and extracted with methylene chloride. Evaporation of the dried (potassium carbonate) methylene chloride extracts yields the crude product as an amorphous solid. This is dissolved in methanol and diluted with 0.5 N potassium hydroxide solution to saponify small amounts of ester formed in the reaction. The clear alkaline solution is then acidified to give, after filtration, the phenolic amide (II). Recrystallization from ethyl acetate-petroleum ether then furnishes the desired amide (II), M.P. 164–166°. Further recrystallization from ethyl acetate-Skellysolve C-petroleum ether furnishes an analytical sample with M.P. 164–166°;

$\nu_{max.}^{Nujol}$ 3350 (OH), 3050 ($\triangleright CH_2$), 1640 (CO) cm.$^{-1}$.

Analysis for $C_{19}H_{23}NO_3$.—Calcd.: C, 72.82; H, 7.40; N, 4.47. Found: C, 72.74; H, 7.37; N, 4.25.

Analysis for $C_{18}H_{23}NO_3$.—Calcd.: C, 71.73; H, 7.69; N, 4.65. Found: C, 71.46; H, 7.74; N, 4.64.

Example B

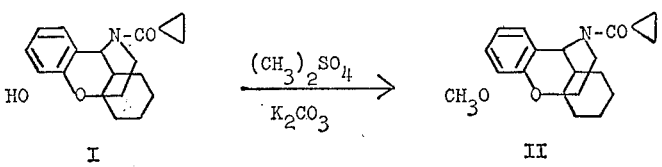

11 - cyclopropylcarbonyl - 1,2,3,4,9,9a - hexahydro - 5-methoxy-9,4a-iminoethano-4aH-xanthene hydrochloride A stirred solution of 16 g. (0.0535 mole) of the N-cyclopropylcarbonylphenol (I) in 250 ml. of methanol is treated with a solution of 60 g. of potassium carbonate in 80 ml. of water. To the resulting mixture is added 20 g. (0.16 mole) of dimethylsulfate. After stirring for 15 min. at room temperature, the mixture is refluxed for 1 hr., cooled and evaporated to remove methanol. The residue is diluted with 500 ml. of water and extracted with 600 ml. of ether. The ether solution is washed with water, dried (potassium carbonate) and evaporated, leaving the product (II) as a white solid, M.P. 136–138°. Recrystallization from ethyl acetate furnishes the analytically pure methyl ether (II), M.P. 138–139°;

$\lambda_{max.}^{EtOH}$ m$\mu$ ($\epsilon$) 279 (2620), 284 sh (2600); $\nu_{max.}^{Nujol}$ 3050 ($\triangleright CH_2$), 1615 (C=O), 942 cm.$^{-1}$.

Analysis for $C_{20}H_{25}NO_3$.—Calcd.: C, 73.36; H, 7.70; N, 4.28. Found: C, 73.58; H, 7.67; N, 4.45.

Example C

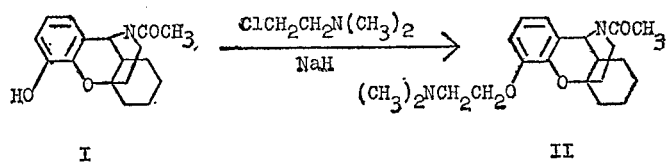

Example A

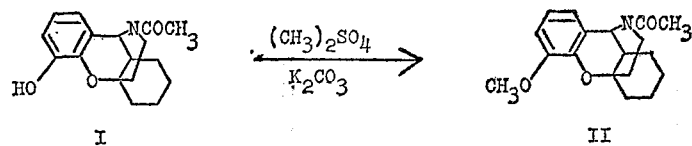

11-acetyl-1,2,3,4,9,9a-hexahydro-5-methoxy-9,4a-iminoethano-4aH-xanthene

To a solution of 10 g. (0.035 mole) of the N-acetyl compound (I) in 200 ml. of methanol, there is added a solution of 40 g. of potassium carbonate in 50 ml. of water, followed by 15 g. (0.12 mole) of dimethyl sulfate. The resulting suspension is stirred at reflux for one hr., cooled and evaporated in vacuo to remove most of the methanol. The residue is extracted with ether and the ether solution, after drying (potassium carbonate) is evaporated, leaving the crude methyl ether II as a clear highly viscous oil. Recrystallization of a small sample, initially from Skellysolve C, then from ethyl acetate, furnishes the pure crystalline N-acetyl methyl ether (II), M.P. 116–117°;

$\nu_{max.}^{Nujol}$ 1625 (C=O) cm.$^{-1}$

11 - acetyl - 5 - [2 - dimethylamino)ethoxy]-1,2,3,4,9,9a-hexahydro-9,4a - iminoethano - 4aH - xanthene hydrobromide To a solution of 8 g. (0.028 mole) of the N-acetylphenol (I) in 100 ml. of 1:1 toluene-dimethylformamide is added 3 g. (0.06 mole) of a 50% sodium hydride-mineral oil suspension. When the evolution of hydrogen is nearly complete, a dried (potassium carbonate) solution of β-dimethylaminoethyl chloride (prepared from 15 g. (0.104 mole) of the hydrochloride) in 150 ml. of toluene is added. The mixture is heated on the steam bath for 2½ hrs., cooled, treated with aqueous 2-propanol to destroy excess hydride and evaporated under reduced pressure. The residue is diluted with aqueous potassium carbonate and the product extracted into ether. After drying (potassium carbonate), the ether solution is treated with excess hydrogen bromide to precipitate the salt (II) as a viscous oil. Addition of a small amount of ether to a 2-propanol solution of the crude salt gives an oil which slowly solidifies. Filtration then gives II which is hygroscopic and suitable for further reactions such as the deacetylation described herein in col.——, Example B.

HYDROLYSIS OF N-ACYLATED AMINES

Example A

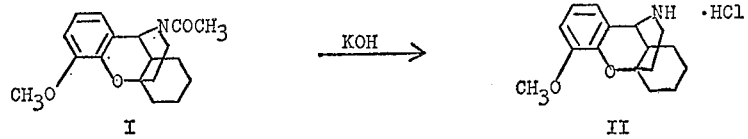

1,2,3,4,9,9a-hexahydro-5-methoxy-9,4a-iminoethano-4aH-xanthene hydrochloride

A solution of 9 g. (about 0.03 mole) of the crude N-acetyl methyl ether (I) and 35 g. of potassium hydroxide in 25 ml. of water and about 75 ml. of methanol is refluxed for a total of five days. After cooling, most of the methanol is removed in vacuo and the residue is extracted with ether. The ether solution, after drying (potassium carbonate) is evaporated, leaving the crude deacylated material as a viscous oil which slowly solidifies, M.P. 64–74°. A portion of this (5.0 g.) is taken up in 200 ml. of ether and treated with excess hydrogen chloride. Filtration gives the desired salt (II), M.P. 227–229°. Recrystallization from 2-propanol-ether furnishes the pure O-methyl hydrochloride II, M.P. 229–231°;

$\lambda_{max.}^{EtOH}$ m$\mu$ ($\epsilon$) 225 sh (7100), 230 (7220), 282 (2920); $\nu_{max.}^{Nujol}$ 2450, 2600, 2700, 2750 (NH+), 938 cm.$^{-1}$.

Analysis for $C_{16}H_{21}NO_3 \cdot HCl$.—Calcd.: C, 64.97; H, 7.50; N, 4.74. Found: C, 64.85; H, 7.39; N, 4.91.

Example B

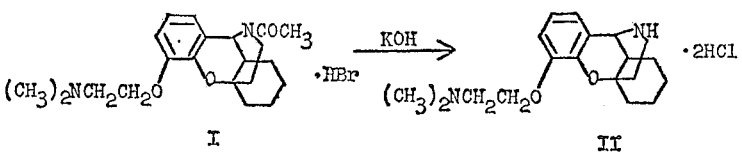

5-[2-(dimethylamino)ethoxy]-1,2,3,4,9,9a-hexahydro-9,4a-iminoethano-4aH-xanthene dihydrochloride A two phase mixture of 10 g. (about 0.023 mole) of the crude acetylated basic ether salt (I), 300 ml. of 1-propanol and 75 ml. of 10 N aqueous potassium hydroxide is refluxed for two days. The cooled mixture is partially evaporated in vacuo to remove alcohol and the residue is diluted with water and extracted with ether. The resulting ether solution of the product is washed with water, dried (potassium carbonate), decolorized with charcoal and treated with an excess of hydrogen chloride. The crude oily salt is recrystallized from 2-propanol-ether to give the hygroscopic dihydrochloride II, M.P. 250–253°. A further recrystallization from the same system furnishes an analytically pure sample, M.P. 254–256°;

$\lambda_{max.}^{EtOH}$ m$\mu$ ($\epsilon$) 221 (8160), 282 (2940); $\nu_{max.}^{Nujol}$ 3400 (H$_2$O), 2400–2700 (NH+), 945 cm.$^{-1}$.

Analysis for $C_{19}H_{28}N_2O_2 \cdot HCl$.—Calcd.: C, 58.61; H, 7.77; N, 7.19. Found: C, 58.31; H, 7.88; N, 7.25.

N-SUBSTITUTION

Example A

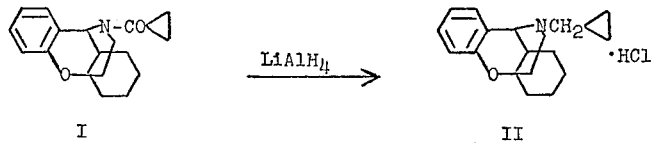

11-cyclopropylmethyl-1,2,3,4,9,9a-hexahydro-9,4a-iminoethano-4aH-xanthene hydrochloride A solution of 8.0 g. (0.027 mole) of the cyclopropylamide I in 300 ml. of ether is added slowly to a stirred mixture of 3 g. (0.08 mole) of lithium aluminum hydride. The resulting mixture is stirred for 3 hrs. at room temperature, excess hydride is destroyed by the cautious addition of water and the mixture is filtered from inorganics. The filtrate is dried (potassium carbonate) and treated with excess hydrogen chloride. Filtration gives the desired salt II, M.P. 249–251°. Recrystallization from 2-propanol-ether furnishes an analytical sample of the cyclopropylmethylamine II, M.P. 250–252°;

$\lambda_{max.}^{EtOH}$ m$\mu$ ($\epsilon$) 218 (7000), 223 (6900), 279 (2660), 287 (2500); $\nu_{max.}^{Nujol}$ 2400 (NH+), 945 cm.$^{-1}$.

Analysis for $C_{19}H_{25}NO \cdot HCl$.—Calcd.: C, 71.35; H, 8.19; N, 4.38. Found: C, 71.64; H, 8.37; N, 4.21.

Example B

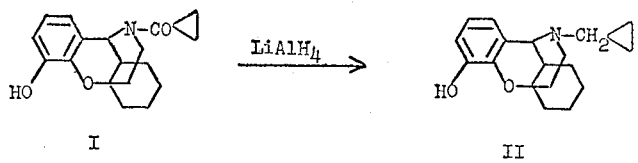

11-cyclopropylmethyl-1,2,3,4,9,9a-hexahydro-9,4a-iminoethano-4aH-xanthen-5-ol

A solution of 5.7 g. (0.018 mole) of the cyclopropyl amide (I) in 75 ml. of tetrahydrofuran is added slowly to a stirred slurry of 3 g. (0.08 mole) of lithium aluminum hydride in 150 ml. of tetrahydrofuran at room temperature. The resulting mixture is refluxed for 3½ hrs., cooled and allowed to stand overnight. Excess hydride is then decomposed with ethylacetate, then saturated aqueous ammonium tartarate is added slowly to coagulate the inorganic salts. After decanting the mixture, the solids are washed thoroughly with tetrahydrofuran and the combined organic solutions are dried (magnesium sulfate) and evaporated. The crude residue is dissolved in N hydrochloric acid and extracted with ether to remove neutral materials. The acid solution is then made basic with saturated potassium carbonate. The resulting crude solid is filtered and dissolved in methylene chloride. After drying (magnesium sulfate) and evaporation of the solvent, there is yielded the tertiary amine (II), M.P. 166–168°. Recrystallization from ethyl acetate furnishes 3.0 g. of pure phenolic cyclopropylmethylamine II, M.P. 167–169°;

$\lambda_{max.}^{EtOH}$ m$\mu$ ($\epsilon$) 280 (2580), 285 sh (2540); $\nu_{max.}^{Nujol}$ 3050 ($\triangleright CH_2$), 935 cm.$^{-1}$.

Analysis for $C_{19}H_{25}NO_2$.—Calcd.: C, 76.22; H, 8.42; N, 4.68. Found: C, 76.44; H, 8.62; N, 4.61.

Example C

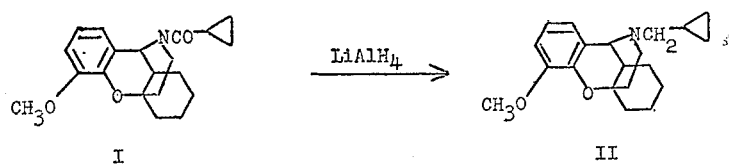

11-cyclopropylmethyl-1,2,3,4,9,9a-hexahydro-5-methoxy-9,4a-iminoethano-4aH-xanthene hydrochloride A solution of 10 g. (0.03 mole) of the amide (I) in 200 ml. of tetrahydrofuran is slowly added to a mixture of 3 g. (0.08 mole) of lithium aluminum hydride and 100 ml. of tetrahydrofuran. The mixture is refluxed for 4 hrs., cooled, and treated with ethyl acetate to destroy excess hydride. Water (about 20 ml.) is then added to aid in the separation of inorganics and the mixture is treated with potassium carbonate and filtered. The combined solids are washed thoroughly with tetrahydrofuran. The combined filtrates are evaporated in vacuo, leaving the product (II) as an oil which slowly crystallizes, M.P. 82–84°. A small sample, recrystallized twice from ethyl acetate-petroleum ether for analysis, has M.P. 87–88°;

$\lambda_{max.}^{EtOH}$ m$\mu$ ($\epsilon$) 222 sh (9560), 278 (2600), 284 sh (2560); $\nu_{max.}^{Nujol}$ 3030 ($\triangleright CH_2$), 938 cm.$^{-1}$.

Analysis for $C_{20}H_{27}NO_2$.—Calcd.: C, 76.64; H, 8.68; N, 4.47. Found: C, 76.67; H, 8.70; N, 4.55.

The *hydrochloride* is prepared from an ether solution of 8 g. of the base by treatment with hydrogen chloride. Filtration affords the salt, M.P. 233–235°. Recrystallization from 2-propanol-ether gives the analytically pure N-cyclopropylmethyl hydrochloride, M.P. 235–237°;

$\lambda_{max.}^{EtOH}$ m$\mu$ ($\epsilon$) 225 (7600), 284 (3200); $\nu_{max.}^{Nujol}$ 2420 (NH+), 943 cm.$^{-1}$.

Analysis for $C_{20}H_{27}NO_2 \cdot HCl$.—Calcd.: C, 68.65; H, 8.07; N, 10.13. Found: C, 68.50; H, 8.11; N, 10.22, 11.06.

Example D

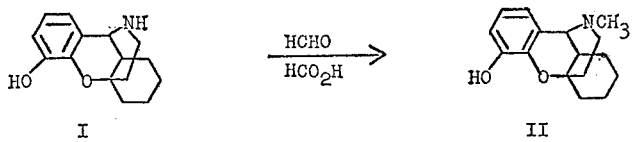

1,2,3,4,9,9a-hexahydro-11-methyl-9,4a-iminoethano-4aH-xanthen-5-ol

A solution of 10 g. (0.041 mole) of the secondary amine (I), 27 g. (0.3 mole) of 37% aqueous formaldehyde and 100 ml. of 98% formic acid is heated on the steam bath for 3 hrs., cooled and evaporated to near dryness. The residue is diluted with 250 ml. of water and made slightly basic (pH 7.5) with sodium bicarbonate. Filtration at this point gives the crude product, M.P. 120–130°. The filtrate is extracted with methylene chloride to give, after drying and evaporation, a second crop, M.P. 172–174°. Two recrystallizations of this second fraction from ethyl acetate furnish the pure N-methyl derivative (II), M.P. 175–177°;

$\lambda_{max.}^{MeOH}$ m$\mu$ ($\epsilon$) 222 (8690) sh, 280 (2540), 286 sh (2490) $\nu_{max.}^{Nujol}$ 2550, 2700 (OH $\cdots$ N), 935 cm.$^{-1}$.

Analysis for $C_{16}H_{21}NO_2$—Calcd.: C, 74.10; H, 8.16; N, 5.40. Found: C, 73.93; H, 8.16; N, 5.26.

Example E

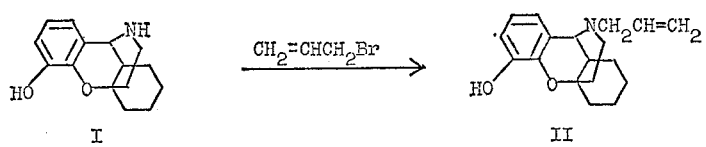

11-allyl-1,2,3,4,9,9a-hexahydro-9,4a-iminoethano-4aH-xanthen-5-ol

To a stirred suspension of the phenolic secondary amine (I) and 12 g. of sodium bicarbonate in 200 ml. of dimethylformamide is added 6.05 g. (0.05 mole) of allyl bromide. The resulting mixture is stirred 1 hr. at 120°, cooled, and diluted to 1 l. with water. The crude product is filtered and recrystallized from methanol-water to give the N-allyl compound (II), M.P. 122–124°. An analytical sample is obtained by recrystallization from Skellysolve B, and has M.P. 123–124°;

$\lambda_{max.}^{EtOH}$ m$\mu$ ($\epsilon$) 222 sh (9400), 280 (2560), 284 sh (2520); $\nu_{max.}^{Nujol}$ 927 (=$CH_2$), 940 cm.$^{-1}$.

Analysis for $C_{18}H_{23}NO_2$.—Calcd.: C, 75.75; H, 8.12; N, 4.91. Found: C, 75.99; H, 8.25; N, 4.64.

Example F

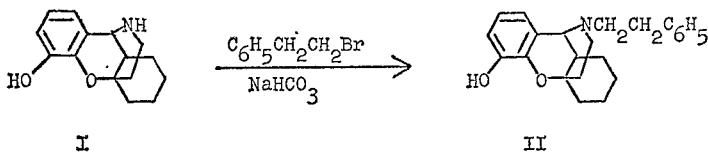

1,2,3,4,9,9a-hexahydro-11-phenethyl-9,4a-iminoethano-4aH-xanthen-5-ol

A mixture of 12.3 g. (0.05 mole) of the secondary amine I, 11.1 g. (0.06 mole) of phenethyl bromide and 15 g. of sodium bicarbonate in 250 ml. of dimethylformamide is heated at reflux for 2 hrs. The cooled reaction mixture is filtered, the inorganics washed with dimethylformamide and the combined filtrates are evaporated to dryness in vacuo. The residue is crystallized directly from methanol-water to give the crude tertiary amine II, M.P. 168–170°. Recrystallization from a large volume of methanol then gives the analytically pure N-phenethyl derivative II, M.P. 169–171°.

$\lambda_{max.}^{MeOH}$ m$\mu$ ($\epsilon$) 281 (3000), 286 (2940); $\nu_{max.}^{Nujol}$ 943, 738, 695 cm.$^{-1}$.

Analysis for $C_{23}H_{27}NO_2$.—Calcd.: C, 79.05; H, 7.79; N, 4.01. Found: C, 79.05; H, 7.78; N, 4.07.

Example G

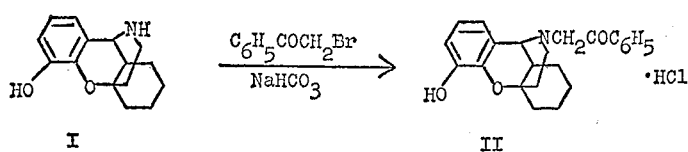

1,2,3,4,9,9a-hexahydro-11-phenacyl-9,4a-iminoethano-4aH-xanthen-5-ol hydrochloride A mixture of 12.3 g. (0.05 mole) of the secondary amine I, 11.9 g. (0.06 mole) of phenacyl bromide and 15 g. of sodium bicarbonate in 200 ml. of dimethylformamide is stirred at reflux for one hour. The solvent is removed in vacuo and the residue dissolved in methanol. Addition of water gives the crude free base of II as a viscous oil which is taken up in ether. After drying (sodium sulfate), the ethereal solution is treated with an excess of hydrogen chloride to give II, M.P. 261–263°. Recrystallization from an ethanol-methanol-ether mixture furnishes the pure N-phenacyl hydrochloride II, M.P. 263–265°.

$\lambda_{max.}^{EtOH}$ m$\mu$ ($\epsilon$) 235 (14,600), 280 (4160); $\nu_{max.}^{Nujol}$ 3200 (OH), 2500 (NH$^+$), 1695 (CO), 945, 785, 765, 745 cm.$^{-1}$.

Analysis for $C_{23}H_{25}NO_3 \cdot HCl$.—Calcd.: C, 69.08; H, 6.55; N, 3.50. Found: C, 69.21; H, 6.58; N. 3.71.

Example H

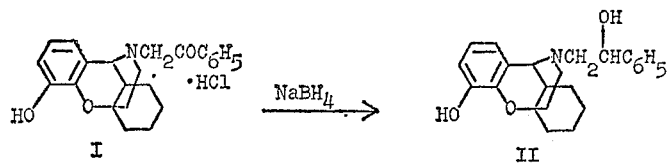

1,2,3,4,9,9a-hexahydro-11-($\beta$-hydroxyphenethyl)-9,4a-iminoethano-4aH-xanthen-5-ol hydrochloride A solution of 7 g. (0.015 mole) of 1,2,3,4,9,9a-hexahydro-11-phenacyl-9,4a-iminoethano-4aH-xanthen-5-ol hydrochloride (I) in 100 ml. of methanol is treated with a total of 1.85 g. (0.05 mole) of sodium borohydride, added, in small portions during 10 min. After stirring for one hour, the mixture is diluted with 500 ml. of water and filtered. The amorphous solid is dissolved in ether and, after drying (potassium carbonate) the ether solution is treated with an excess of hydrogen chloride. The resulting solid is filtered, giving (II), M.P. 240–251°. Recrystallization from a small amount of absolute ethanol furnishes an analytical sample of the phenolic amino alcohol (II), M.P. 252–260°;

$\lambda_{max.}^{EtOH}$ m$\mu$ ($\epsilon$) 222 sh (7600), 286 (3300); $\nu_{max.}^{Nujol}$ 3250 (OH), 2550–2700 (NH$^+$), 940 cm.$^{-1}$.

Analysis for $C_{23}H_{27}NO_3 \cdot HCl$.—Calcd.: C, 68.73; H, 7.02; N, 3.48. Found: C, 68.83; H, 7.22; N, 3.26.

Example I

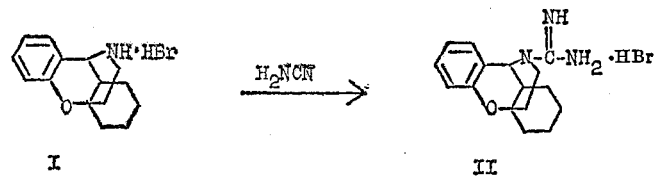

1,2,3,4,9,9a-hexahydro-9,4a-iminoethano-4aH-xanthene-11-carboxamidine hydrobromide A solution of 15.5 g. (0.05 mole) of the secondary amine hydrobromide (I) and 4.2 g. (0.01 mole) of cyanamide in 200 ml. of dimethylformamide is refluxed for 6 hrs. After standing overnight at room temperature, most of the solvent is removed at reduced pressure, and the residue triturated with 250 ml. of water. The resulting crystalline product is filtered to give the crude guanidine derivative (II), M.P. 225–235°. Two recrystallizations from methanol-ether furnish analytically pure II, M.P. 259–261°;

$\lambda_{max.}^{MeOH}$ m$\mu$ ($\epsilon$) 277 (2830), 285 (2630); $\nu_{max.}^{Nujol}$ 3150, 3300 (guanidine NH$^+$), 1640 (C=N), 945 cm.$^{-1}$.

Analysis for $C_{16}H_{21}N_3O \cdot HBr$.—Calcd.: C, 54.55; H, 6.29; N, 11.93. Found: C, 54.65; H, 6.34; N, 11.79.

Example J

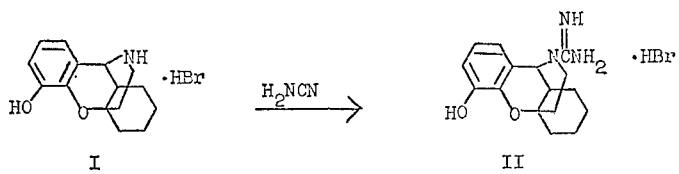

1,2,3,4,9,9a-hexahydro-5-hydroxy-9,4a-iminoethano-4aH-xanthene-11-carboxamidine hydrobromide A solution of 16.3 g. (0.05 mole) of the secondary amine salt I and 4.2 g. (0.1 mole) of cyanamide in 200 ml. of dimethylformamide is refluxed for 3 hrs. The cooled mixture is diluted with 1500 ml. of ether to precipitate the guanidine salt (II) as a viscous oil. The separated oil is dissolved in 75 ml. of water and seeded with II obtained from a similar reaction. The desired salt slowly precipitates. Filtration gives II, M.P. 290–300°. Three recrystallizations from methanol-ether (charcoal) then furnish the analytically pure phenolic guanidine salt II, M.P. 301–303°;

$\lambda_{max.}^{EtOH}$ 283 m$\mu$ ($\epsilon$ 2750); $\nu_{max.}^{Nujol}$ 3100, 3300, 3450 (OH, guanidine NH$^+$), 1640 (C=N$^+$), 943 cm.$^{-1}$.

Analysis for $C_{16}H_{21}N_3O_2 \cdot HBr$.—Calcd.: C, 52.18; H, 6.02; N, 11.41. Found: C, 52.15; H, 6.09; N, 11.27.

Example K

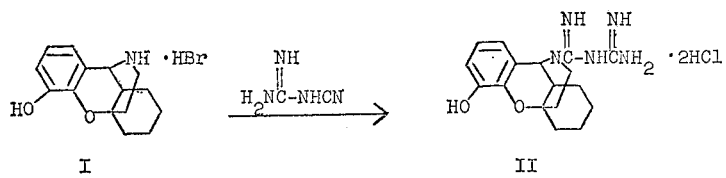

11-(N-amidinoamidino)-1,2,3,4,9,9a-hexahydro-9,4a-iminoethano-4aH-xanthen-5-ol dihydrochloride A solution of 32.6 g. (0.1 mole) of the secondary amine salt I and 9.2 g. (0.11 mole) of N-cyanoguanidine in 500 ml. of dimethylformamide is stirred at reflux for 7 hrs., then cooled and allowed to stand overnight. Most of the solvent is removed in vacuo and 800 ml. of water is added to the residue. The aqueous solution is filtered from a small amount of insolubles, treated with charcoal, made basic with about 300 ml. of 50% potassium carbonate solution and filtered to give the crude free base of the product. A solution of this base in 300 ml. of methanol is treated with an equal volume of 2-propanol, filtered rapidly and allowed to crystallize, giving the crude free base, M.P. 195° with sintering from 175°. A solution of 10 g. of the base in 400 ml. of ether is filtered and treated with excess hydrogen chloride; dilution with 600 ml. of ether causes the slow separation of crystals of the dihydrochloride II. Filtration, after standing for 18 hrs., gives II, M.P. 251–253°. Recrystallization from methanol-ether then furnishes the pure biguanide dihydrochloride II, M.P. 251–253°;

$\lambda_{max.}^{EtOH}$ m$\mu$ ($\epsilon$) 241 (14,200), 281–286 (1770); $\nu_{max.}^{Nujo}$ 3320 (OH), 2600 (NH$^+$), 1650 (C=N), 935 cm.$^{-1}$.

Having described our invention, what we desire to secure by Letters Patent is:

1. A compound of the formula:

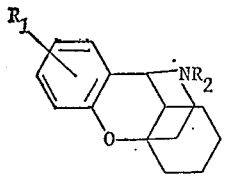

wherein $R_1$ is hydrogen, hydroxy, lower alkoxy or dilower alkyl amino, piperidino, morpholino, or pyrrolidino ethoxy and $R_2$ is hydrogen, lower alkyl, phenyl lower alkyl, acyl of a carboxylic acid of up to 8 carbons, carboxamidino or amidinocarboxamidino and the nontoxic pharmaceutically acceptable acid addition salts thereof.

2. The compound of claim 1 which is 1,2,3,4,9,9a-hexahydro-11-methyl-9,4a-iminoethano-4aH-xanthene.

3. The compound of claim 1 which is 1,2,3,4,9,9a-hexahydro-9,4a-iminoethano-4aH-xanthen-5-ol.

4. The compound of claim 1 which is 11-acetyl-1,2,3,4,9,9a-hexahydro-9,4a-iminoethano-4aH-xanthen-5-ol.

5. The compound of claim 1 which is 11-cyclopropylcarbonyl - 1,2,3,4,9,9a - hexahydro - 9,4a - iminoethano-4aH-xanthene.

6. The compound of claim 1 which is 11-acetyl-1,2,3,4,9,9a-hexahydro-5-methoxy-9,4a-iminoethano - 4aH - xanthene.

7. The compound of claim 1 which is 11-acetyl-5-[2-(dimethylamino)ethoxy] - 1,2,3,4,9,9a - hexahydro - 9,4a-iminoethano-4aH-xanthene hydrobromide.

8. The compound of claim 1 which is 1,2,3,4,9,9a-hexahydro-5-methoxy-9,4a-iminoethano-4aH-xanthene hydrochloride.

9. The compound of claim 1 which is 11-cyclopropylmethyl - 1,2,3,4,9,9a - hexahydro - 9,4a - iminoethano-4aH-xanthen-5-ol.

10. The compound of claim 1 which is 1,2,3,4,9,9a-hexahydro - 11 - methyl - 9,4a - iminoethano - 4aH - xanthen-5-ol.

11. The compound of claim 1 which is 1,2,3,4,9,9a-hexahydro - 11 - phenethyl - 9,4a - iminoethano - 4aH - xanthen-5-ol.

12. The compound of claim 1 which is 1,2,3,4,9,9a-hexahydro - 11 - phenacyl - 9,4a - iminoethano - 4aH - xanthen-5-ol hydrochloride.

13. The compound of claim 1 which is 1,2,3,4,9,9a-hexahydro - 11 - ($\beta$ - hydroxyphenethyl) - 9,4a - iminoethano-4aH-xanthen-5-ol hydrochloride.

14. The compound of claim 1 which is 1,2,3,4,9,9a-hexahydro - 9,4a - iminoethano - 4aH - xanthene - 11 - carboxamidine hydrobromide.

15. The compound of claim 1 which is 11-(N-amidinoamidino) - 1,2,3,4,9,9a - hexahydro - 9,4a - iminoethano-4aH-xanthen-5-ol dihydrochloride.

16. Process for the production of a compound of the formula:

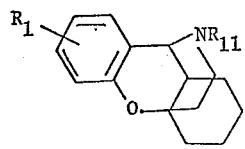

wherein $R_1$ is hydrogen, hydroxy, lower alkoxy or dilower alkyl amino, piperidino, morpholino, or pyrrolidino ethoxy and $R_{11}$ is hydrogen, lower alkyl, phenyl lower alkyl, which comprises contacting a compound of the formula:

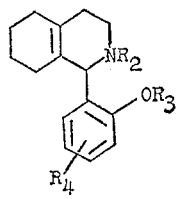

wherein $R_3$ is hydrogen, lower alkyl or acyl of a carboxylic acid of up to 8 carbons and $R_4$ is hydrogen, lower alkoxy or carboxylic acyloxy of up to 8 carbons at a temperature from about 100 to about 200° C. in the presence of hydrobromic acid.

17. Process for the production of a compound of the formula:

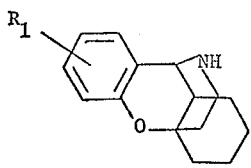

wherein $R_1$ is hydrogen, hydroxy, lower alkoxy or dilower alkyl amino, piperidino, morpholino, or pyrrolidino ethoxy which comprises contacting a compound of the formula:

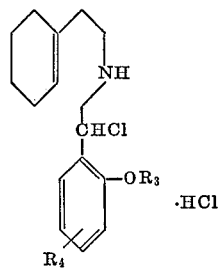

with hydrobromic acid at a temperature of from about 100 to about 200° C.

18. Process for the production of a compound of the formula:

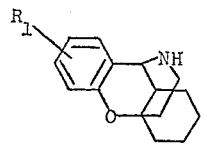

wherein $R_1$ is hydrogen, hydroxy, lower alkoxy or dilower alkylamino, piperidino, morpholino or pyrrolidino ethoxy which comprises heating a compound of the formula:

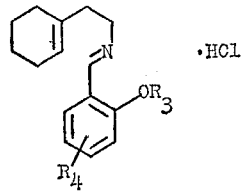

References Cited

UNITED STATES PATENTS

| | | | |
|---|---|---|---|
| 2,651,635 | 9/1953 | Henecka | 260—285 |
| 2,723,268 | 11/1955 | Henecka | 260—285 |
| 3,314,964 | 4/1967 | Shavel et al. | 260—288 |
| 3,326,923 | 6/1967 | Shavel et al. | 260—288 |

OTHER REFERENCES

Koelsch, et al., Journ. Org. Chem. vol. 23, pp. 1606-8 (1958). Abstracted in Chem. Abstr., vol. 53, 18020 f, (1958).

Chem. Abstr. vol. 53, Subject Index p. 6021 S.

DONALD G. DAUS, Primary Examiner

U.S. Cl. X.R.

260—247.5, 287, 288, 289, 465, 544, 559, 566, 570.8, 600, 690; 424—258